(12) United States Patent
Wang et al.

(10) Patent No.: US 12,417,517 B2
(45) Date of Patent: Sep. 16, 2025

(54) POINT CLOUD DENOISING METHOD BASED ON MULTI-LEVEL ATTENTION PERCEPTION

(71) Applicant: Nanjing University of Aeronautics and Astronautics, Nanjing (CN)

(72) Inventors: Jun Wang, Nanjing (CN); Anyi Huang, Nanjing (CN); Zhoutao Wang, Nanjing (CN); Yuanpeng Liu, Nanjing (CN)

(73) Assignee: Nanjing University of Aeronautics and Astronautics, Nanjing (CN)

( * ) Notice: Subject to any disclaimer, the term of this patent is extended or adjusted under 35 U.S.C. 154(b) by 411 days.

(21) Appl. No.: 18/049,203

(22) Filed: Oct. 24, 2022

(65) Prior Publication Data

US 2023/0306559 A1    Sep. 28, 2023

(30) Foreign Application Priority Data

Mar. 17, 2022    (CN) .......................... 202210262877.2

(51) Int. Cl.
*G06N 3/04* (2023.01)
*G06N 3/048* (2023.01)
*G06T 5/00* (2024.01)
*G06T 5/70* (2024.01)

(52) U.S. Cl.
CPC .............. *G06T 5/70* (2024.01); *G06N 3/048* (2023.01); *G06T 2207/10028* (2013.01); *G06T 2207/20084* (2013.01)

(58) Field of Classification Search
CPC ............ G06T 5/70; G06T 2207/10028; G06T 2207/20084; G06N 3/048
See application file for complete search history.

(56) References Cited

U.S. PATENT DOCUMENTS

| | | | | |
|---|---|---|---|---|
| 10,796,414 | B2* | 10/2020 | Vogels | G06V 10/82 |
| 11,037,274 | B2* | 6/2021 | Vogels | G06V 10/454 |
| 11,182,612 | B2* | 11/2021 | Liu | G06V 10/7715 |
| 11,354,779 | B2* | 6/2022 | Xu | G06T 5/20 |
| 11,701,771 | B2* | 7/2023 | Mousavian | G06N 3/063 700/245 |

(Continued)

OTHER PUBLICATIONS

US 11,928,602 B2, 03/2024, Luciw (withdrawn)*

(Continued)

*Primary Examiner* — Gregory M Desire

(57) ABSTRACT

The present disclosure provides a point cloud denoising method based on multi-level attention perception, including the following steps: constructing a data set of point cloud denoising; constructing a point cloud denoising neural network, including a patch feature encoder, a global level perception module, a global level attention module, and a multi-offset decoder module, and training a network model by using the data set of point cloud denoising; for input point cloud, separately obtaining a neighborhood patch of a point of each original data point, and inputting coordinates of each data point in the neighborhood patch of a point to a trained denoising neural network to obtain a location offset of each original point; and separately adjusting, based on the obtained location offset, a location corresponding to each original data point in the input point cloud, to complete point cloud denoising.

6 Claims, 4 Drawing Sheets

(56) References Cited

U.S. PATENT DOCUMENTS

| | | | |
|---|---|---|---|
| 11,908,202 B2* | 2/2024 | Lee | G06V 10/42 |
| 12,032,067 B2* | 7/2024 | Urtasun | G06T 17/00 |
| 2019/0187251 A1* | 6/2019 | Ghosh | G06N 3/045 |
| 2022/0101103 A1* | 3/2022 | Fatemi | G06N 3/088 |
| 2022/0343152 A1* | 10/2022 | Dai | G06N 3/047 |

OTHER PUBLICATIONS

Duan et al, 3D Point Cloud Denoising via Deep Neural Network Based Local Surface Estimation, 2019, IEEE International Conference on Acoustics, Speech and Signal Processing (ICASSP), pp. 8553-8557 (Year: 2019).*

* cited by examiner

Input	Result of denoising

POINT CLOUD DENOISING METHOD BASED ON MULTI-LEVEL ATTENTION PERCEPTION

CROSS REFERENCE TO RELATED APPLICATION

This patent application claims the benefit and priority of Chinese Patent Application No. 202210262877.2, filed on Mar. 17, 2022, the disclosure of which is incorporated by reference herein in its entirety as part of the present application.

TECHNICAL FIELD

The present disclosure pertains to the field of point cloud preprocessing, and in particular, to a point cloud denoising method based on multi-level attention perception.

BACKGROUND ART

In recent years, with the rapid development of computer science and technology, technologies such as virtual reality and computer graphics further promote the emergence of technologies such as augmented reality. These emerging technologies have an urgent need for high-quality three-dimensional (3D) representation data. Especially in the industrial field, because of indicator requirements such as high precision, there is a strict demand on 3D data quality.

Nowadays, a 3D point cloud is widely used as a representation manner of a 3D object for a long time. Due to a simple structure of the 3D point cloud and a small storage space required, great progress has been made in recent years, especially in the industrial field, such as an industrial robot and industrial measurement. However, the point cloud is easily interfered in an obtaining process. Consequently, original point cloud usually carries a large quantity of noise points. Therefore, preprocessing needs to be performed, so that the point cloud can be further applied to an actual project.

Currently, common point cloud denoising methods may be roughly classified into two types: (1) Ordered point cloud denoising: Point cloud is organized in an ordered structure in space, that is, an ordered point cloud. Currently, common processing methods include: a filtering method, a global energy method, an observation method, a curve check method, a string height difference method, and the like. These methods have their own advantages. However, most of point cloud acquired by devices nowadays is often disordered. (2) Scattered point cloud denoising: So far, scattered point cloud denoising methods may be roughly classified into the following six types: a signal processing-based denoising algorithm, a statistical-based denoising algorithm, a projection-based denoising algorithm, a moving least squares-based denoising algorithm, a non-local self-similarity denoising algorithm, and a data-driven denoising algorithm. Due to an introduced neural network technology, the data-driven denoising method attracts attention of many researchers. Data features are learned from a large quantity of training samples, to optimize point cloud, so that an effect beyond most of the previous methods can be obtained. However, currently, in the neural network, the methods do not consider multi-level patch information, which causes a poor denoising effect.

SUMMARY

In view of the disadvantages in the prior art, the present disclosure provides a point cloud denoising method based on multi-level attention perception, to implement high-quality denoising for disordered point cloud. The present disclosure adopts the following technical solutions:

A point cloud denoising method based on multi-level attention perception includes the following steps:

step S1: obtaining point cloud of several models, selecting M sampling points from each piece of point cloud, obtaining, for each sampling point, neighborhood patches of points of the sampling point in different scales, and constructing a data set of point cloud denoising by using coordinates of each data point in each of the neighborhood patches of points as input and by using a location offset of the sampling point relative to real coordinates of the sampling point as a label;

step S2: constructing a point cloud denoising neural network, and training a network model by using the data set of point cloud denoising;

step S3: for input point cloud, separately obtaining a neighborhood patch of a point of each original data point, and inputting coordinates of each data point in the neighborhood patch of a point to a trained denoising neural network to obtain a location offset of each original data point; and step S4: separately adjusting, based on the obtained location offset, a location corresponding to each original data point in the input point cloud, to complete point cloud denoising.

Further, in step S1, a minimum-scale neighborhood patch of a point, a middle-scale neighborhood patch of a point, and a maximum-scale neighborhood patch of a point whose radiuses are a, b, and c are separately obtained by using the sampling point as a center; N data points are selected from each neighborhood patch of a point, and coordinates of the N data points are used as input to construct a point cloud dataset; and in step S3, input of the denoising neural network corresponding to each original data point in the input point cloud is determined in a same manner.

Further, if a quantity of the data points in each of the neighborhood patches of points is greater than N, the N data points are randomly sampled, or if a quantity of the data points in each of the neighborhood patches of points is less than N, resampling is performed until there are N data points.

Further, in step S2, the point cloud denoising neural network includes a patch feature encoder, a global level perception module, a global level attention module, and a multi-offset decoder module; the patch feature encoder is configured to extract a multi-scale patch depth feature, and compress the multi-scale patch depth feature into a global feature vector; the global level perception module is configured to map the global feature vector into a global level perception vector, so as to implement global feature perception; the global level attention module is configured to map the global feature vector into attention vectors at different levels; and the multi-offset decoder module applies the global level perception vector and the attention vectors at different levels to offset calculation, so as to obtain a location offset.

Further, the patch feature encoder includes three point cloud feature encoders corresponding to the neighborhood patches of points; and each encoder is a PointWeb network including a four-layered adaptive feature adjustment (AFA) module, and is configured to extract a patch depth feature at a corresponding scale, and compress the patch depth feature into the global feature vector by using a maximum pool operation;

the global level perception module first splits multi-scale global feature vectors into one feature vector; the feature vector passes through one full-connection layer, and then passes through four full-connection layers; output of three full-connection layers provides global level perception vectors for the global level attention module; and after output of the other full-connection layer is activated by using a Sigmoid function, one feature vector of global level perception attention is obtained;

the global level attention module performs element-wise multiplication on the global feature vector and the corresponding global level perception vectors from the global level perception module, and adds obtained feature vectors and the original global feature vector to obtain attention vectors at different levels; and the multi-offset decoder module separately passes the attention vectors at different levels from the global level attention module through the AFA module, performs element-wise multiplication with the feature vector of global level perception attention of the global level perception module, and adds obtained three feature vectors to obtain the location offset.

Further, a loss function Lf of the point cloud denoising neural network is:

$$L_f = \alpha(L_{min} + L_{mid} + L_{max}) + L_{total}, \text{ where}$$

$\alpha$ is a weight parameter; $L_{min}$, $L_{mid}$, and $L_{max}$ are respectively a minimum-scale offset loss, a middle-scale offset loss, and a maximum-scale offset loss; $L_{total}$ is a total offset loss obtained after weighted summation of the three scale offset losses; and a measurement function L of each scale offset loss is:

$$L = \eta L_{proj}{}^a + (1-\eta) L_{rep},$$

where $$L_{rep} = \max_{p_j \in P_i} |\overline{p}_i - p_j|; \text{ and}$$

$$L_{proj}^a = \frac{\sum_{p_j \in P_i} |(\overline{p}_i - p_j) \cdot n_{p_j}^T| \cdot \phi(\|\overline{p}_i - p_j\|) \theta(n_{\overline{p}_i}, n_{p_j})}{\sum_{p_j \in P_i} \phi(\|\overline{p}_i - p_j\|) \theta(n_{\overline{p}_i}, n_{p_j})},$$

where $\eta$ is a weight parameter; $\overline{p}_i$ is a center point of a patch neighborhood; $p_j$ is a neighboring point in a patch corresponding to $\overline{p}_i$ in a true value; $n_{p_j}$ and $n_{p_i}$ are respectively real normal lines of the points $p_j$ and $$\overline{p}_i; \phi(\cdot) = \exp\left(-\frac{\|\overline{p}_i - p_j\|^2}{\sigma_p^2}\right); \sigma_p = 4\sqrt{\text{diag}/m};$$

diag is a diagonal length of a circumscribed rectangle of a patch neighborhood; m is a point quantity of a patch neighborhood; and $$\theta(\cdot) = \exp\left(-\frac{1 - n_{\overline{p}_i}^T n_{p_j}}{1 - \cos(\sigma_n)}\right),$$

in which $\sigma_n$ is a support angle.

Further, M=10,000 sampling points are selected from each piece of point cloud by using a farthest point sampling method; the radiuses of the minimum-scale neighborhood patch of a point, the middle-scale neighborhood patch of a point, and the maximum-scale neighborhood patch of a point are respectively 4%, 5%, and 6% of a circumscribed sphere radius of a model in which the sampling point is located; and N=512 data points are selected from each neighborhood patch of a point.

The present disclosure has the following beneficial effects:

By constructing the point cloud denoising neural network and by using the global level perception module and the global level attention module, the present disclosure overcomes a disadvantage that global neighborhood information and level neighborhood information of a point cloud cannot be both perceived in the prior art, further improves a point cloud denoising effect, and improves point cloud quality.

DETAILED DESCRIPTION OF THE EMBODIMENTS

The present disclosure is described in further detail below with reference to the accompanying drawings.

To implement high-quality denoising for disordered point cloud, the present disclosure proposes a point cloud denoising method based on multi-level attention perception. The method can be directly applied to various optimization processing procedures of point cloud. During a specific implementation, a trained network model may be deployed in a corresponding program, to perform denoising preprocessing on original point cloud.

Figure 1:
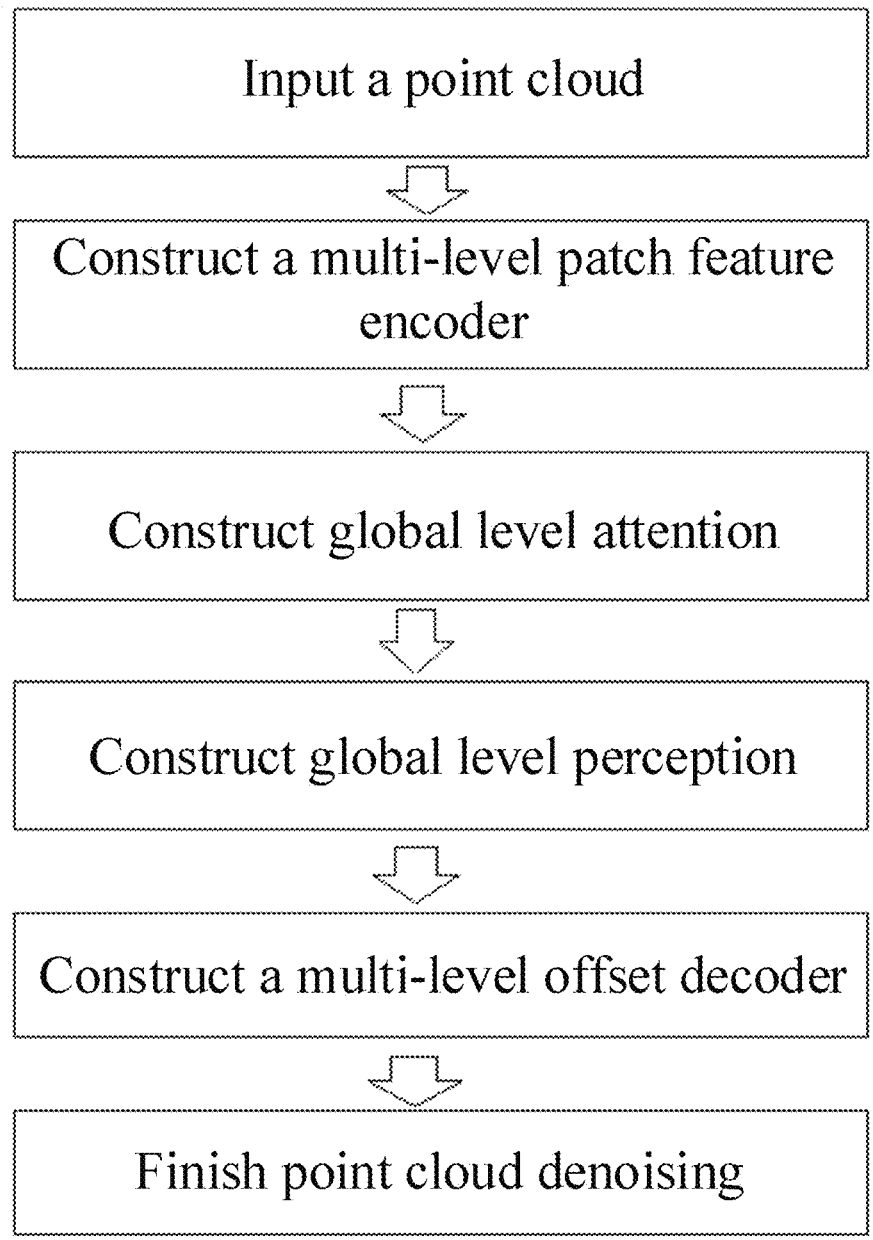
FIG. 1 is a schematic flowchart of a method according to the present disclosure.

As shown in FIG. 1, a method in the present disclosure mainly includes the following steps:

S1: Obtain input point cloud, obtain a multi-level patch from the input point cloud, and fuse multi-scale neighborhood information.

S2: Construct a multi-level patch feature encoder, and extract a multi-level patch depth feature.

S3: Construct a global level perception module, and map the depth feature into a global level perception vector to implement global feature perception.

S4: Construct a global level attention module, and map the depth feature into attention vectors at different levels.

S5: Construct a multi-offset decoder, and apply the attention vectors at different levels and the global level perception vector to offset calculation, so as to obtain a location offset corresponding to a data point in a point cloud.

S6: Apply the location offset to the original point cloud, to implement point cloud denoising.

Figure 2:
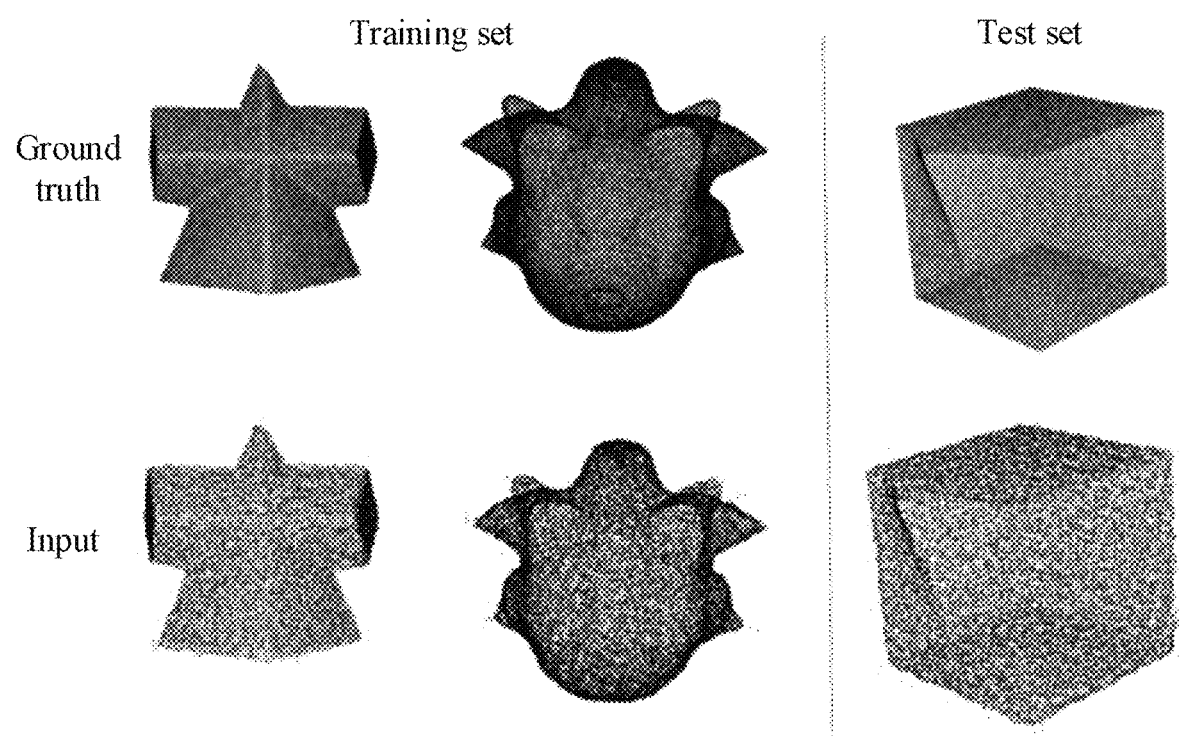
FIG. 2 is a schematic diagram of a training sample and a test sample according to the present disclosure.

In actual application, a point cloud denoising neural network based on multi-level attention perception needs to be trained by using data with a real label. After a model loss value converges, a model of the point cloud denoising neural network based on multi-level attention perception is obtained. FIG. 2 is schematic diagram of a data set example of training and test of a model of a point cloud denoising neural network.

Preferably, when the data set of point cloud denoising is constructed, five Gaussian noises of different scales are added to the point cloud. 80% of the data set is used as a training set, and 20% of the data set is used as a test set. During training, 10000 points are selected in each point cloud by using farthest point sampling. For each point, 4%, 5%, and 6% of a circumscribed sphere radius of the entire model are taken to construct patch neighborhoods. 512 points in the patch neighborhood are selected as input. For a patch having more than 512 points, the 512 points are randomly sampled. For a patch having less than 512 points, resampling is performed until there are the 512 points.

Figure 3:
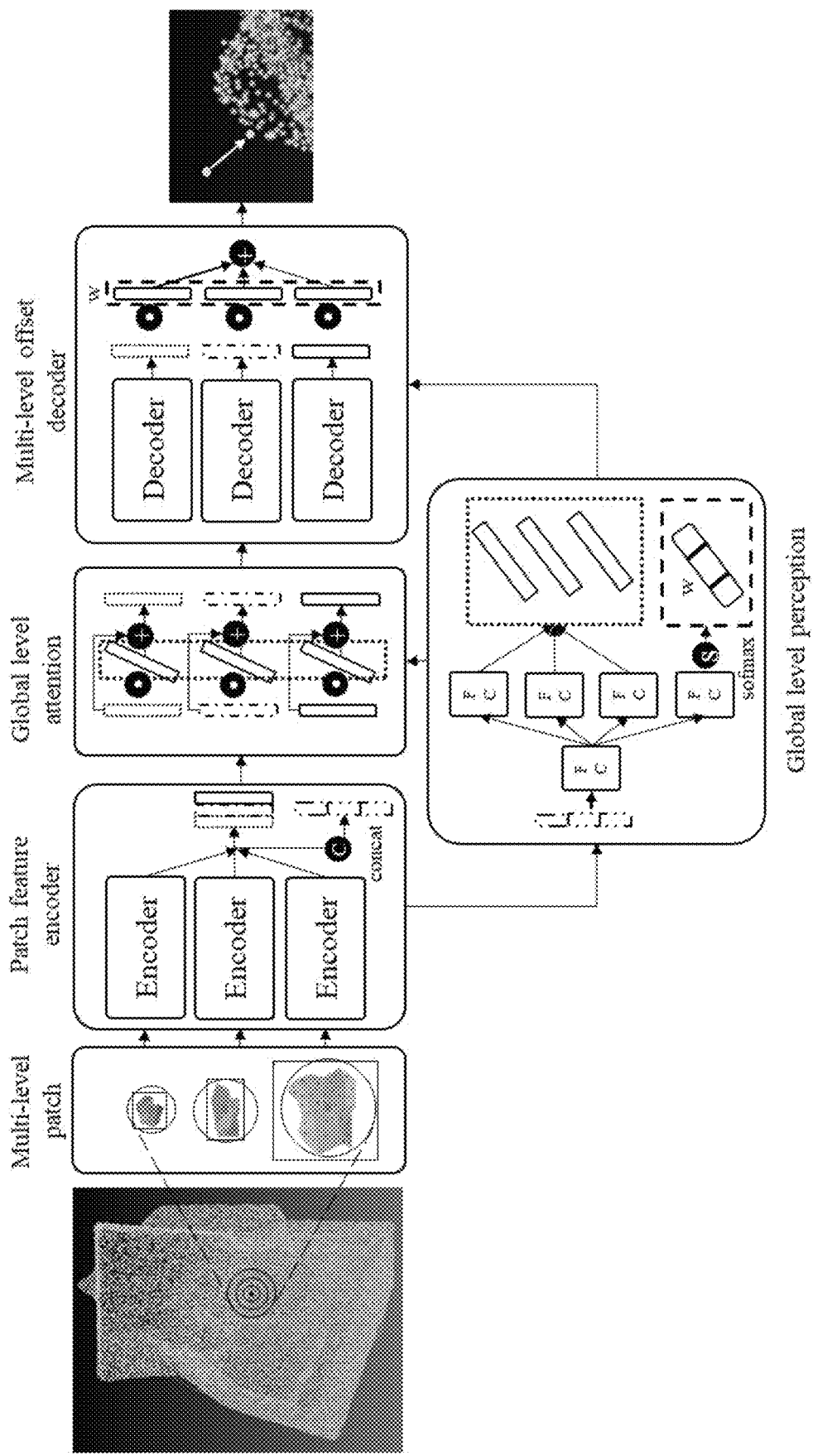
FIG. 3 is an architectural diagram of a point cloud denoising neural network constructed in a method according to the present disclosure.

Modules in the point cloud denoising neural network are shown in FIG. 3.

Preferably, constructing a multi-level patch feature encoder and extracting a multi-level patch depth feature includes: constructing a point cloud feature encoder for input of a multi-level point cloud patch with different circumscribed sphere radiuses. The encoder is a customized PointWeb network including a four-level adaptive feature adjustment (AFA) module, and is configured to extract a multi-level neighborhood feature. This further enhances perception of a point cloud feature point for the neighborhood feature. After a maximum pool operation, a feature matrix is compressed into a global feature vector.

Preferably, constructing a global level attention module and mapping the depth feature into attention vectors at different levels includes: separately performing element-wise attention multiplication on feature vectors at different levels and three perception vectors from the global level perception module, and adding an obtained feature vector and the original global feature vector to obtain a final output of the global level attention module.

Preferably, constructing a global level perception module and mapping the depth feature into a global level perception vector to implement global feature perception includes: splicing the feature vectors at different levels into one feature vector, and passing through one full-connection layers; and separately passing through four full-connection layers, where three of them provide the global level perception vector for the global level attention module, and after the last full-connection layer, an activation operation of a Sigmoid function is performed to obtain one feature vector of global level perception attention.

Preferably, constructing a multi-offset decoder and applying the attention vectors at levels and the global level perception vector to offset calculation includes: separately passing output features from the global level attention module through the AFA module, performs element-wise attention multiplication with the feature vector of global level perception attention of the global level perception module, and adding three feature vectors to obtain a final offset value.

Preferably, point cloud denoising is completed, and the location offset is applied to the original point cloud to implement point cloud denoising. In actual application, a point cloud denoising neural network based on multi-level attention perception needs to be trained by using data with a real label. After a model loss value converges, a model of the point cloud denoising neural network based on multi-level attention perception is obtained.

Loss functions used during training include three loss functions at different levels and an overall loss function:

$L_f = \alpha(L_{min} + L_{mid} + L_{max}) + L_{total}$, where $L_{min}$ is a minimum-scale offset loss, $L_{mid}$ is a middle-scale offset loss, and $L_{max}$ is a maximum-scale offset loss; $L_{total}$ is a total offset loss obtained after weighted addition of the three scale offset losses. The four losses are measured in a same way, but referenced real values vary based on a scale.

Specifically, a loss measurement function is:

$L = \eta L_{proj}^a + (1-\eta) L_{rep}$, where $\eta$ is taken as 0.97; and $L_{rep}$ is:

$L_{rep} = \max_{p_j \in P_i} |\bar{p}_i - p_j|$, where $\bar{p}_i$ is a center point of a filtered patch; and $p_j$ is a point in a corresponding patch centered on $\bar{p}_i$ in a true value. This aims to enable point cloud distribution after denoising to be more uniform. Further, $$L_{proj}^a = \frac{\sum_{p_j \in P_i} |(\bar{p}_i - p_j) \cdot n_{p_j}^T| \cdot \phi(\|\bar{p}_i - p_j\|) \theta(n_{\bar{p}_i}, n_{p_j})}{\sum_{p_j \in P_i} \phi(\|\bar{p}_i - p_j\|) \theta(n_{\bar{p}_i}, n_{p_j})},$$

where $$\phi(\cdot) = \exp\left(-\frac{\|\bar{p}_i - p_j\|^2}{\sigma_p^2}\right)$$

is a Euclidean distance correlation between a point and a patch corresponding to a real value, and a smaller distance indicates a larger importance weight; $\sigma_p = 4\sqrt{\text{diag}/m}$; diag is a diagonal length of an outer rectangular frame of a patch; and $$\theta(\cdot) = \exp\left(-\frac{1 - n_{\bar{p}_i}^T n_{p_j}}{1 - \cos(\sigma_n)}\right),$$

in which $\sigma_n$ is a support angle, and a default value is 15°. $\phi(\cdot)$ is a difference between two points in normal directions, and a bigger difference indicates less importance and more reserved detailed information.

Figure 4:
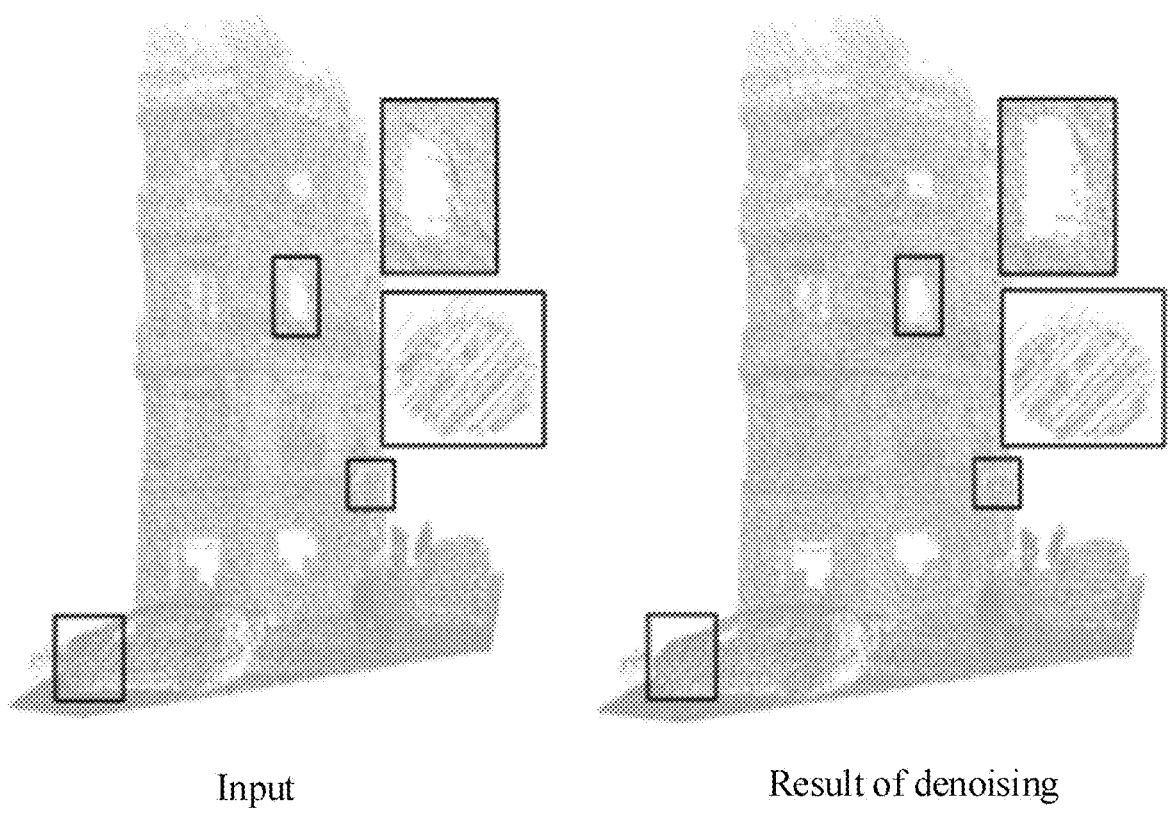
FIG. 4 is a visualization effect diagram of a point cloud before and after denoising according to an embodiment of the present disclosure.

A point cloud denoising effect according to the method in the present disclosure is shown in FIG. 4. It can be learned from the figure that, the point cloud denoising neural network provided in the present disclosure can optimize point cloud quality, and effectively improve the point cloud denoising effect.

What is described above is merely the preferred implementation of the present disclosure, the scope of protection of the present disclosure is not limited to the above examples, and all technical solutions following the idea of the present disclosure fall within the scope of protection of the present disclosure. It should be noted that several modifications and adaptations made by those of ordinary skill in the art without departing from the principle of the present disclosure should fall within the scope of protection of the present disclosure.

Those skilled in the art may easily think of other implementation solutions of the present disclosure after considering the specification and practicing the content disclosed herein. This application is intended to cover any variations, uses, or adaptive changes of the present disclosure. These variations, uses, or adaptive changes follow the general principles of the present disclosure and include common knowledge or conventional technical means in the technical field that are not disclosed by the present disclosure. The specification and the embodiments are to be regarded as examples only, and the true scope and spirit of the present disclosure are pointed out by the claims.

What is claimed is:

1. A point cloud denoising method based on multi-level attention perception, comprising the following steps:

step S1: obtaining point cloud of several models, selecting M sampling points from each piece of point cloud, obtaining, for each sampling point, neighborhood patches of points of the sampling point in different scales, and constructing a data set of point cloud denoising by using coordinates of each data point in each of the neighborhood patches of points as input and by using a location offset of the sampling point relative to real coordinates of the sampling point as a label;

step S2: constructing a point cloud denoising neural network, and training a network model by using the data set of point cloud denoising;

step S3: for input point cloud, separately obtaining a neighborhood patch of a point of each original data point, and inputting coordinates of each data point in the neighborhood patch of a point to a trained denoising neural network to obtain a location offset of each original data point; and step S4: separately adjusting, based on the obtained location offset, a location corresponding to each original data point in the input point cloud, to complete point cloud denoising;

wherein in step S1, a minimum-scale neighborhood patch of a point, a middle-scale neighborhood patch of a point, and a maximum-scale neighborhood patch of a point whose radiuses are a, b, and c are separately obtained by using the sampling point as a center; N data points are selected from each neighborhood patch of a point, and coordinates of the N data points are used as input to construct a point cloud set; and in step S3, input of the denoising neural network corresponding to each original data point in the input point cloud is determined in a same manner.

2. The point cloud denoising method based on multi-level attention perception according to claim 1, wherein if a quantity of the data points in each of the neighborhood patches of points is greater than N, the N data points are randomly sampled, or if a quantity of the data points in each of the neighborhood patches of points is less than N, resampling is performed until there are N data points.

3. The point cloud denoising method based on multi-level attention perception according to claim 1, wherein in step S2, the point cloud denoising neural network comprises a patch feature encoder, a global level perception module, a global level attention module, and a multi-offset decoder module; the patch feature encoder is configured to extract a multi-scale patch depth feature, and compress the multi-scale patch depth feature into a global feature vector; the global level perception module is configured to map the global feature vector into a global level perception vector, so as to implement global feature perception; the global level attention module is configured to map the global feature vector into attention vectors at different levels; and the multi-offset decoder module applies the global level perception vector and the attention vectors at different levels to offset calculation, so as to obtain a location offset.

4. The point cloud denoising method based on multi-level attention perception according to claim 3, wherein the patch feature encoder comprises three point cloud feature encoders corresponding to the neighborhood patches of points; and each encoder is a PointWeb network comprising a four-layered adaptive feature adjustment (AFA) module, and is configured to extract a patch depth feature at a corresponding scale, and compress the patch depth feature into the global feature vector by using a maximum pool operation;

the global level perception module first splits multi-scale global feature vectors into one feature vector; the feature vector passes through one full-connection layer, and then passes through four full-connection layers; output of three full-connection layers provides global level perception vectors for the global level attention module; and after output of the other full-connection layer is activated by using a Sigmoid function, one feature vector of global level perception attention is obtained;

the global level attention module performs element-wise multiplication on the global feature vector and the corresponding global level perception vectors from the global level perception module, and adds obtained feature vectors and the original global feature vector to obtain attention vectors at different levels; and the multi-offset decoder module separately passes the attention vectors at different levels from the global level attention module through the AFA module, performs element-wise multiplication with the feature vector of global level perception attention of the global level perception module, and adds obtained three feature vectors to obtain the location offset.

5. The point cloud denoising method based on multi-level attention perception according to claim 4, wherein a loss function Lf of the point cloud denoising neural network is:

$$L_f = \alpha(L_{min} + L_{mid} + L_{max}) + L_{total}, \text{ wherein}$$

$\alpha$ is a weight parameter; $L_{min}$, $L_{mid}$, and $L_{max}$ are respectively a minimum-scale offset loss, a middle-scale offset loss, and a maximum-scale offset loss; $L_{total}$ is a total offset loss obtained after weighted summation of the three scale offset losses; and a measurement function L of each scale offset loss is:

$$L = \eta L_{proj}^a + (1-\eta) L_{rep}, \text{ wherein}$$

$$L_{rep} = \max_{p_j \in P_i} |\overline{p}_i - p_j|; \text{ and}$$

$$L_{proj}^a = \frac{\sum_{p_j \in P_i} \left|(\overline{p}_i - p_j) \cdot n_{p_j}^T\right| \cdot \phi(\|\overline{p}_i - p_j\|)\theta(n_{\overline{p}_i}, n_{p_j})}{\sum_{p_j \in P_i} \phi(\|\overline{p}_i - p_j\|)\theta(n_{\overline{p}_i}, n_{p_j})}$$

$\eta$ is a weight parameter; $\overline{p}_i$ is a center point of a patch neighborhood; $p_j$ is a neighboring point in a patch corresponding to $\overline{p}_i$ in a true value; $n_{p_j}$ and $n_{p_j}$ are respectively real normal lines of the points $p_j$ and $\overline{p}_i$;

$$\phi(\cdot) = \exp\left(-\frac{\|\overline{p}_i - p_j\|^2}{\sigma_p^2}\right); \sigma_p = 4\sqrt{\text{diag}/m};$$

diag is a diagonal length of a circumscribed rectangle of a patch neighborhood; m is a point quantity of a patch neighborhood, and $$\theta(\cdot) = \exp\left(-\frac{1 - n_{p_i}^T n_{p_j}}{1 - \cos(\sigma_n)}\right),$$

in which $\sigma_n$ is a support angle.

6. The point cloud denoising method based on multi-level attention perception according to claim 1, wherein M=10,000 sampling points are selected from each piece of point cloud by using a farthest point sampling method; the radiuses of the minimum-scale neighborhood patch of a point, the middle-scale neighborhood patch of a point, and the maximum-scale neighborhood patch of a point are respectively 4%, 5%, and 6% of a circumscribed sphere radius of a model in which the sampling point is located; and N=512 data points are selected from each neighborhood patch of a point.

\* \* \* \* \*